(No Model.)  5 Sheets—Sheet 1.
A. C. H. SALLANDROUZE.
LOOM FOR WEAVING TUFTED FABRICS.
No. 410,096.  Patented Aug. 27 1889.
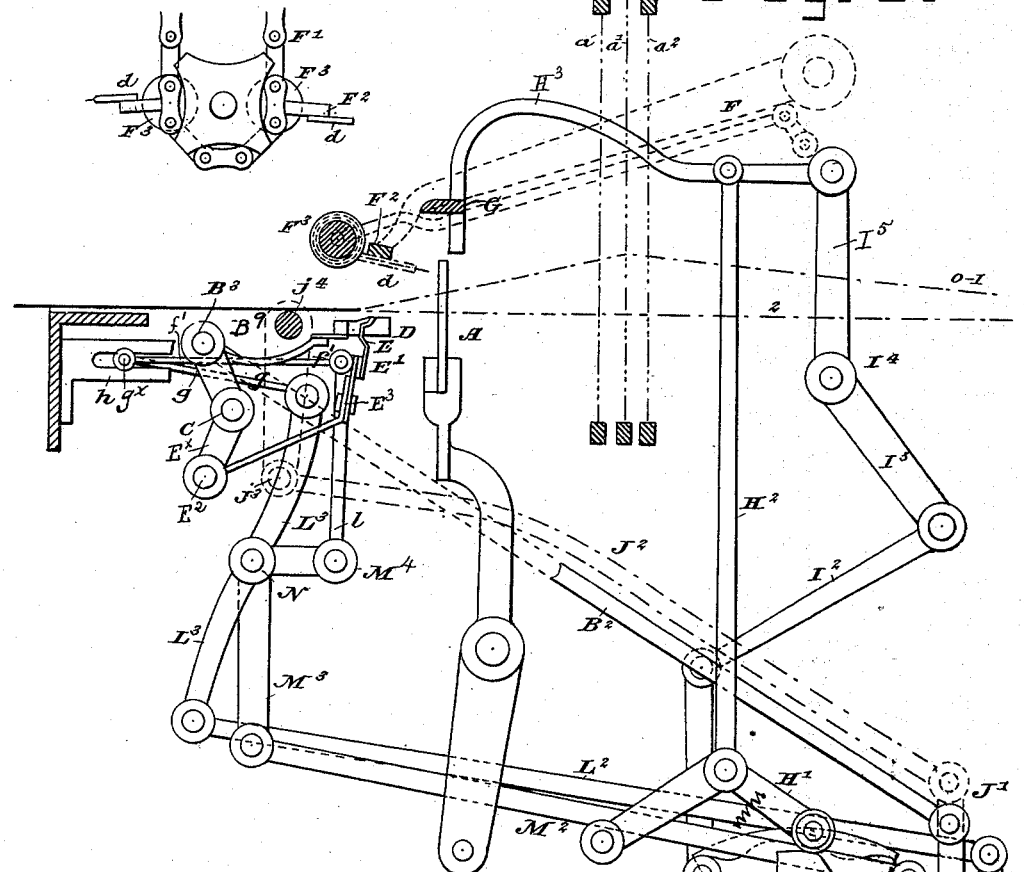
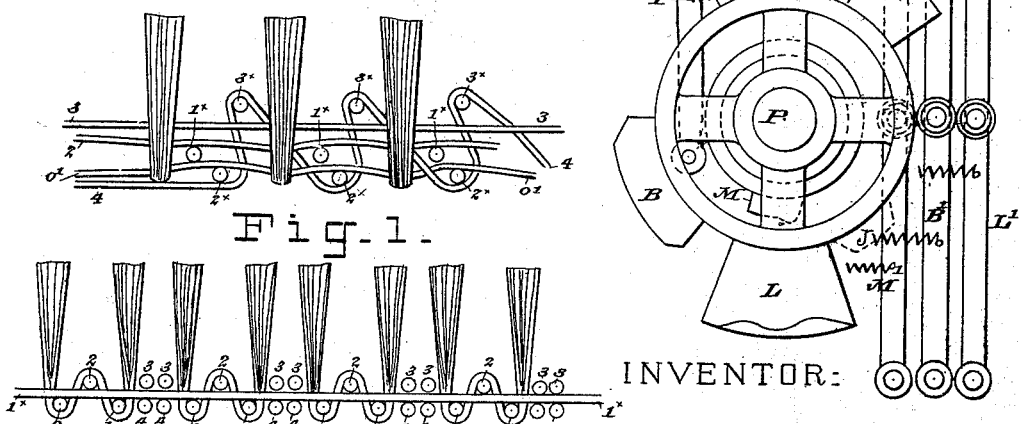
WITNESSES:  INVENTOR:

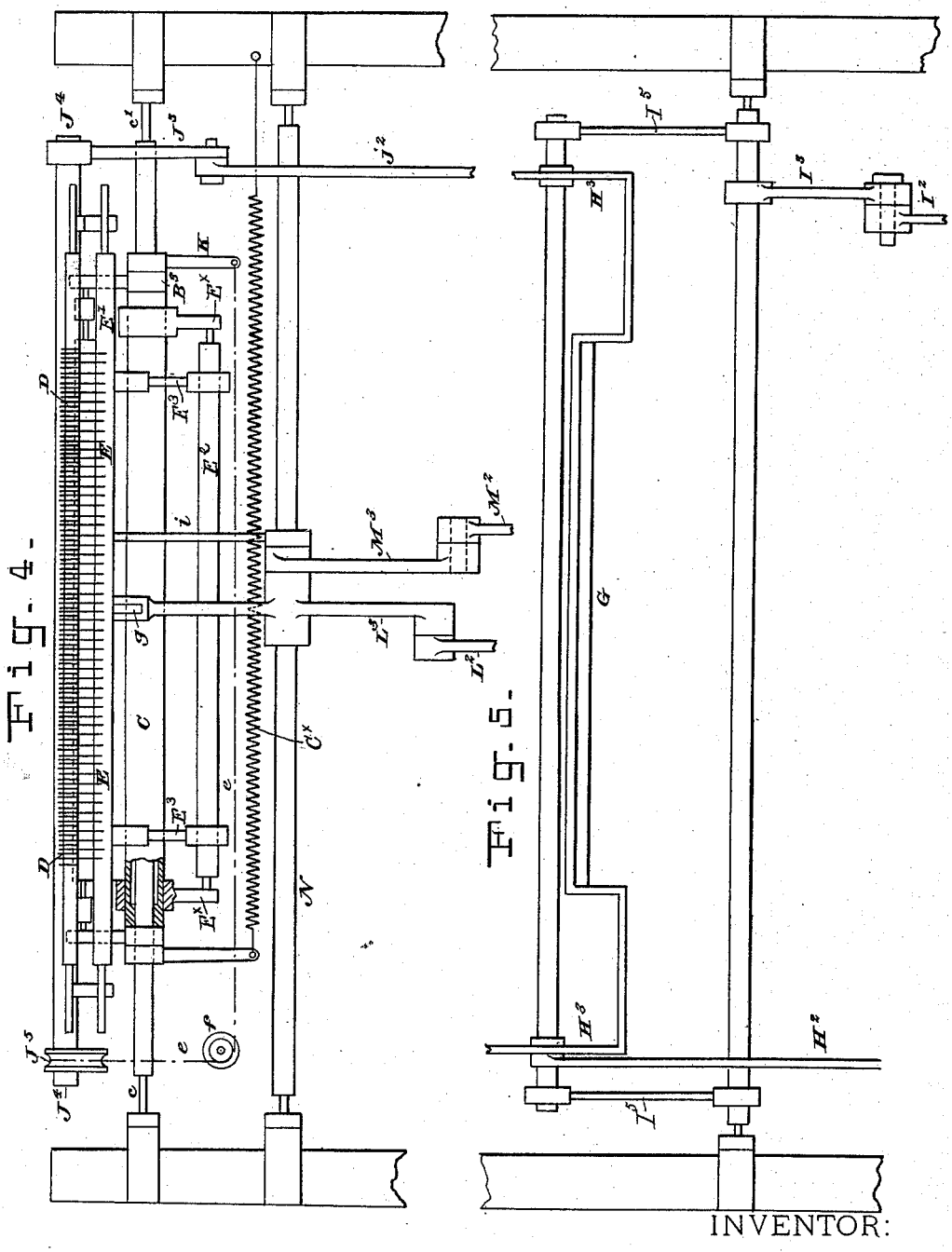

(No Model.) 5 Sheets—Sheet 3.
A. C. H. SALLANDROUZE.
LOOM FOR WEAVING TUFTED FABRICS.
No. 410,096. Patented Aug. 27 1889.
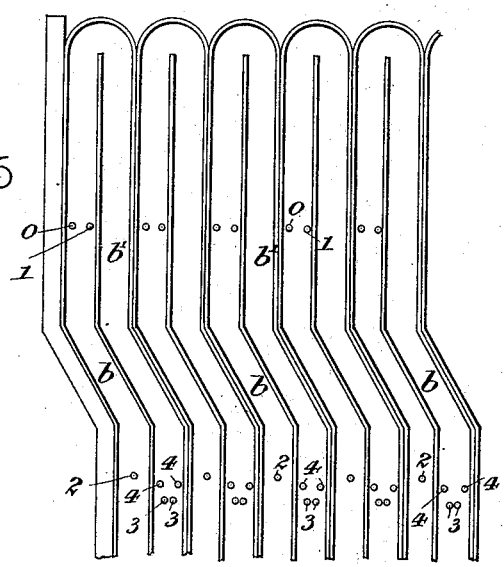
FIG. 6.
FIG. 7.
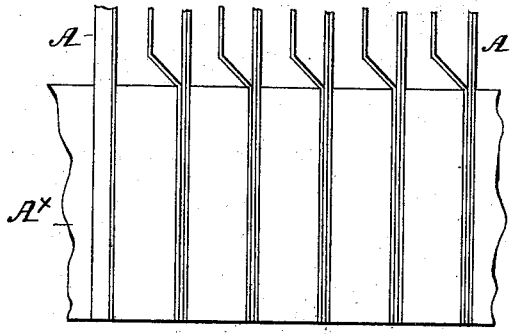
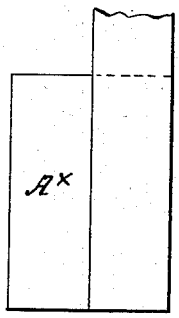
FIG. 8.
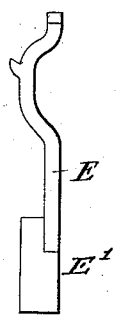
FIG. 9.
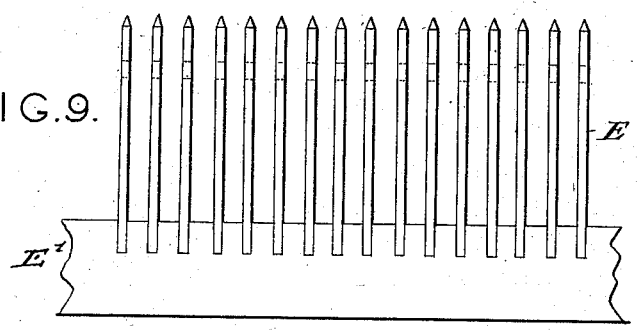

(No Model.) 5 Sheets—Sheet 4.
A. C. H. SALLANDROUZE.
LOOM FOR WEAVING TUFTED FABRICS.
No. 410,096. Patented Aug. 27 1889.
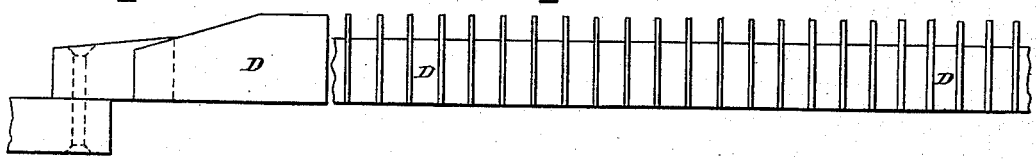
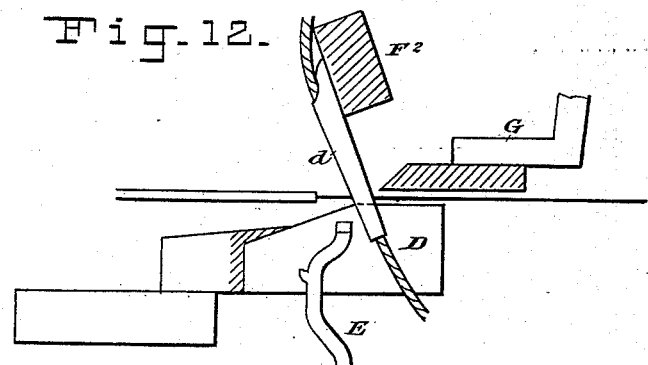
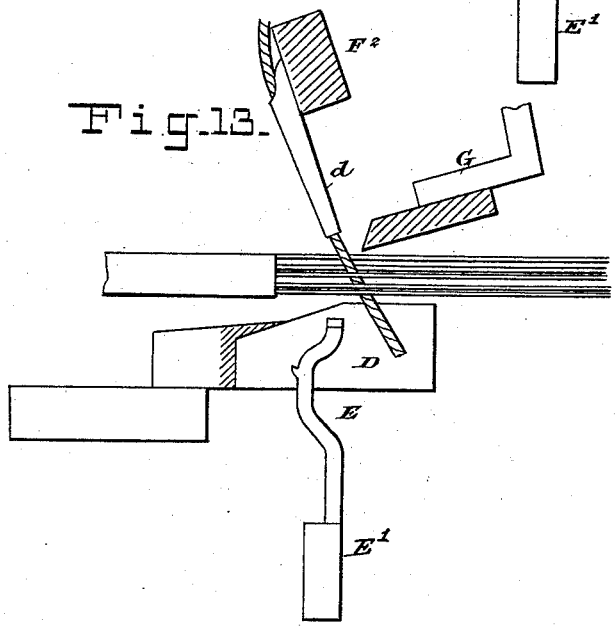
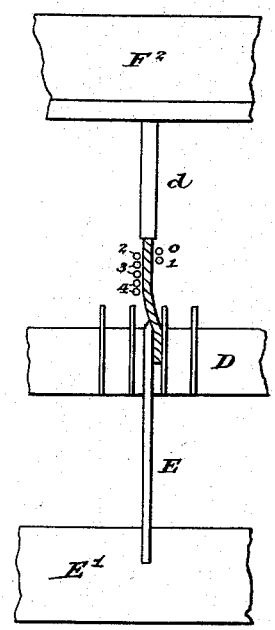
INVENTOR:
WITNESSES:

(No Model.) 5 Sheets—Sheet 5.
A. C. H. SALLANDROUZE.
LOOM FOR WEAVING TUFTED FABRICS.
No. 410,096. Patented Aug. 27 1889.
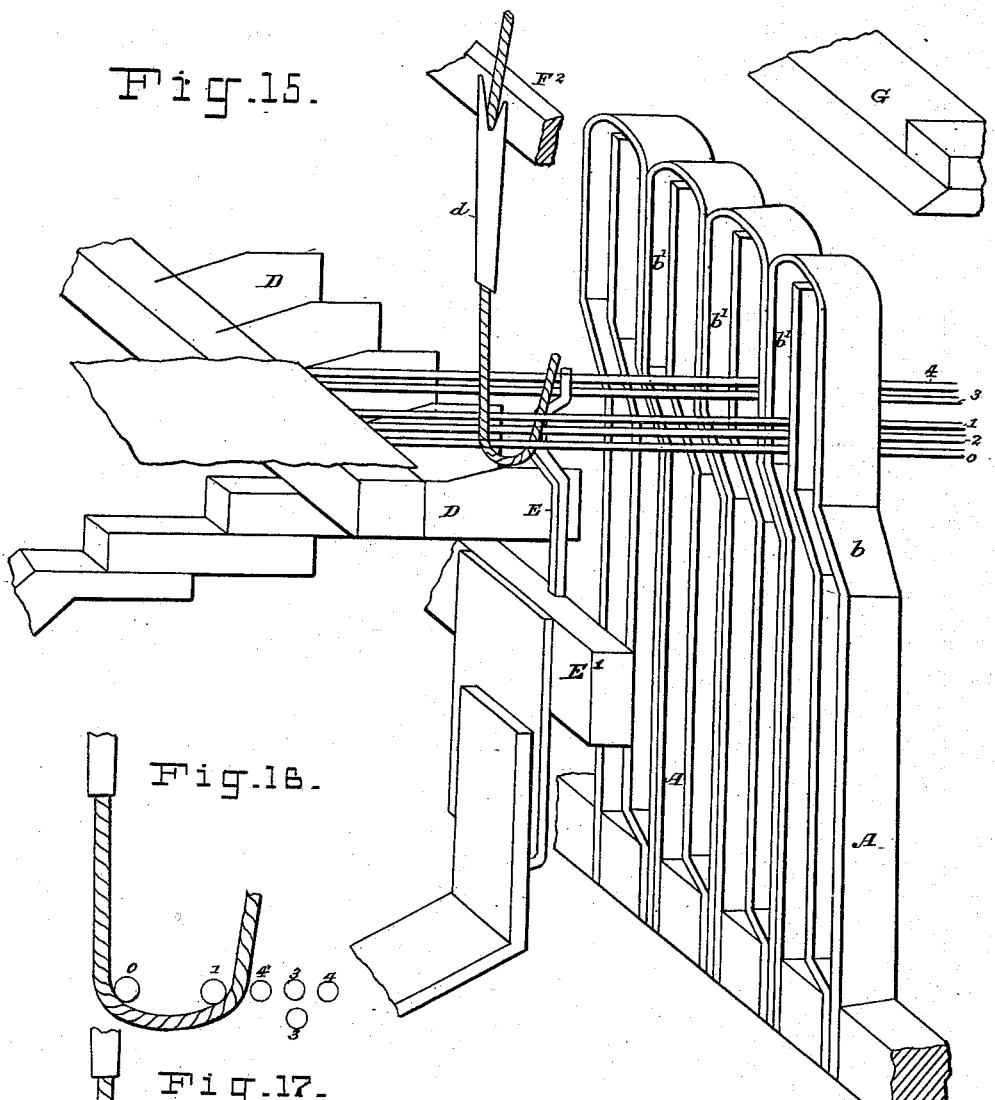
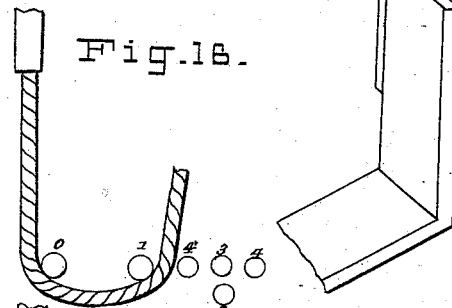
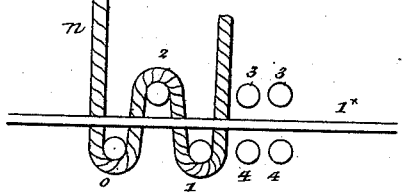
WITNESSES:
INVENTOR:
By _____ Attorney.

UNITED STATES PATENT OFFICE.

ANDRÉ CHARLES HENRY SALLANDROUZE, OF PARIS, FRANCE, ASSIGNOR TO SOCIÉTÉ SALLANDROUZE FRÈRES, OF SAME PLACE.

LOOM FOR WEAVING TUFTED FABRICS.

SPECIFICATION forming part of Letters Patent No. 410,096, dated August 27, 1889.

Application filed April 12, 1888. Serial No. 270,496. (No model.) Patented in England March 1, 1888, No. 3,175; in France February 28, 1888, No. 189,030; in Belgium February 28, 1888, No. 80,811; in Germany March 3, 1888, No. 45,059; in Austria-Hungary June 5, 1888, No. 10,250 and No. 22,553; in Switzerland November 29, 1888, No. 159, and in Italy April 9, 1889, XXII, 23,344, and XLVI, 291.

*To all whom it may concern:*

Be it known that I, ANDRÉ CHARLES HENRY SALLANDROUZE, a citizen of the French Republic, and a resident of Paris, (Seine,) France, have invented certain Improvements in Looms for Weaving Tufted Fabrics, (for which patents have been granted in France, No. 189,030, dated February 28, 1888; in Great Britain, No. 3,175, dated March 1, 1888; in Belgium, No. 80,811, dated February 28, 1888; in Austria-Hungary, No. 10,250 and No. 22,553, dated June 5, 1888; in Italy, XXII, 23,344, XLVI, 291, dated April 9, 1888; in Germany, No. 45,059, dated March 3, 1888, and in Switzerland, No. 159, dated November 29, 1888,) of which the following is a specification.

My invention relates to looms for weaving pile or tufted fabrics, and particularly to carpet-looms; and the object of my invention is to provide a loom, with an automatically operating mechanism, for producing an imitation of what is known as "point d'Orient."

This imitation of point d'Orient is produced as follows: Each strand of wool or other pile fiber enlaces three warp-threads arranged in a group side by side, as seen in plan, passing below the two outer threads and above the middle thread of the group, which is raised above the other two. At the side of this group of three warp-threads is situated another group of four warp-threads, which, with the three of the other group, are interwoven with weft-shots to form a base fabric below the pile. These weft-threads are three in number, and they are passed or shot successively in a particular order during the operation of forming the raised face of the fabric—that is to say, in the regular progress of weaving the fabric.

In this class of carpets the design is obtained in accordance with a known method—namely, by winding the wool to form the pile on rollers or spools carried by endless chains. These spools, bearing the colored and other wool, come one after another to furnish a range of tufts or "points" that form the design by virtue of combinations which are governed by the spooling, and which are called "lecture du dessin."

A loom of the type to which my improvements relate may be found fully illustrated in the reissued United States Patent of Smith and Skinner, No. 9,694, dated May 3, 1881, and the United States Patent of H. Skinner, No. 39,759, dated September 1, 1863, may also be referred to for a fuller understanding of the state of the art respecting this class of looms.

The weaving is effected in the following manner: The seven warp-threads that correspond to each tuft or point of the pile or longitudinal range of tufts being divided into two groups pass through a specially - constructed reed, which divides the warp-threads into groups and serves to shift laterally or "shog" the warp. This reed has bent or elbow - like dents separating its divisions, which operate in such a way as to deflect the warp-threads and permit of the introduction between the groups thereof of the strands of wool which form the tufts or pile. This they do by reason of the crowding laterally, at the moment the shed is formed, of the raised groups of warp - threads by the elbow - like bends in the upright dividing bars or dents of the reed. The introduction of the wool is effected by means of tubes or tubular guides secured to bars, one of which bars is secured to or carried by each spool. The spools and their tube-bars are detached from the endless carrying-chains by means of arms which seize them at their ends and bring them over the warp and oscillate the tube-bars in such a manner as to cause the tubes to penetrate between the warp - threads of each special group. The ends of the wool strands projecting out of the tubes, having passed below the two raised side warp - threads of the group, the evener-bar, which before bore on all of the strands in the row, draws back a little, leaving the wool strands engaged between the warp - threads. The extremities of these strands will be found at this moment lodged within separate cells or spaces between blades projecting from the face of a bar, each cell corresponding exactly with a tube or tubular guide. The bar with the blades, which I denominate the "lateral displacer," is displaced laterally or crosswise of the web below the pairs of raised warp-threads. At this moment a series of lifters or elevators on a bar take under the several wool strands and raise their ends above the level of the warp to the proper height to form the pile. The lateral displacement causes each wool strand to interlock or interweave with its special group of warp-threads. The lifters having effected their object return to a position back of and below that at which they ascended. The pairs of warp-threads before elevated now descend. The third or middle thread of the group, as well as two threads of the group of four, are now raised and a weft-thread shot into the shed or opening thus made. This shot is then beaten up, the reed not being interfered with by the lifters and lateral displacers, as these will have withdrawn out of the way. At this moment the wool strands are cut below the tubes at the proper level to produce the required length of pile. Two other weft-shots are passed through the warp, one below the group of three warp-threads embraced by the wool strand and above the threads of the other group and the other shot above all the warp-threads, thus forming the interweave of the base fabric. This last or upper weft-shot passes under two of the group of four warp-threads, which are raised by the shedding mechanism before the shot is made.

In the drawings I have shown by diagrams the "weave" or interlacing of the warp and weft threads in the fabric, and the mechanism I employ to produce the desired results in a loom and to carry out the method of weaving I have just described.

In these drawings, Figures 1 and 2 are diagrams showing the weave of a fabric produced in a loom provided with my improvements, the former showing the warp in transverse section and the latter the weft in transverse section. Fig. 3 is a side and Fig. 4 a front view of the mechanism detached, constructed in accordance with my invention, employed in producing a fabric such as that shown in Figs. 1 and 2. Fig. 5 is a front view of the bar or evener employed to regularize the tufts of the pile. Figs. 6 and 7 are respectively a front and edge view of the special reed I employ detached and enlarged. Figs. 8 and 9 are respectively an end and front view of the lifter or elevator, which lifts the wool strands which form the pile-tufts above the warp, detached and enlarged. Figs. 10 and 11 are respectively an end and front view of the lateral displacer, which serves to displace the wool strands laterally, detached and enlarged. Figs. 12, 13, 14, 15, 16, and 17 are enlarged detail views illustrating the mode of inserting the wool strand in forming the tuft and the locking of said tuft in the base fabric.

Referring to Figs. 1 and 2, it will be seen that each pile-tuft is interlocked with three warp-threads which form a special group, passing under threads $o$ and 1 and over thread 2. Between the former and the latter passes the weft-shot $1^\times$, thus raising thread 2 above threads $o$ and 1 a height equal to the thickness of said weft-thread $1^\times$. This weave locks the tuft solidly and securely to the three warp-threads of the group. Another weft-shot $2^\times$ is passed above the warp-threads 4 4 and below the other warp-threads, and a third weft-shot $3^\times$ is passed under the warp-threads 4 4 and above the other warp-threads, as seen in Fig. 2. The shedding of the warp, in order to enable these shots to be made, will of course be effected by the shedding mechanism.

A is the reed, which has elbow-like bends in its dents, as seen in Fig. 6, and $A^\times$ is its carrying-frame. The last weft-thread $3^\times$ being shot, the reed A, after having beaten up the shot, stops at about one-third of its course or travel and remains stationary. At the same moment the heddles $a$ $a'$ $a^2$ take such positions that the warp-threads $o$ and 1 remain above the elbow $b$ of the dents of the reed A, Fig. 6, and the warp-threads 2 and 3 and 4 below said elbow $b$. The result of this is that an angle is produced between these two groups of threads by the deviation in their respective courses caused by the bends in the dents of the reed. This shogging or lateral shifting of the warp separates the threads $o$ and 1 from the thread 2 belonging to the same group, as seen in Fig. 6, thus enabling the tuft to be passed about the former two threads without embracing the latter thread. The cam B, Fig. 3, acts on a roller on lever B', which is connected by a rod $B^2$ to an arm $B^3$, fixed on a rock-shaft C, mounted at $c\,c'$ in the frame, as seen in Fig. 4. The lateral displacer D is carried on arms $B^9$, Fig. 1, that extend out from the arms $B^3$, of which there are two, as seen in Fig. 4. The ends of the displacer rest and slide on suitable supporting-brackets, and by the above-described means it is given a horizontal advancing and retreating movement, regulated by the form of the cam B. The displacer D, actuated by this cam, advances to the position seen in Fig. 12. This forward movement of the displacer D causes its blades to pass between the lifters E on the lifter-bar E', and said lifters then stand between said blades. The two carrier-arms F (seen in dotted lines in Fig. 3) now detach from the endless chain F' the tube-bar $F^2$, connected with roller $F^3$. This bar descends, and the tubes $d\,d$ thereon pass down through the web between the groups of warp-threads, Fig. 12. Each tube passes down through a space or angle formed between the adjacent groups of warp-threads, as stated above, and down into a cell or space between the blades on the lateral displacer D, the said cells then standing just below the gaps or spaces in the web. When the tube-bar $F^2$ descends, the evener-bar G also descends with it. This is effected by the cam H, Fig. 3, which acts on a roller on lever H', which latter is connected by a rod H² to carrier-arms H³. These arms (which are situated at each end of the loom) impart to bar G an up-and-down movement corresponding to the form of cam H. The cam I acts on a roller on lever I', connected by a rod I² to an arm I³, fixed on a rock-shaft I⁴. Other arms I⁵ on said rock-shaft are coupled, respectively, to the arms H³. Thus the arm I³ imparts to bar G, through arms H³ and the intermediate devices, a horizontal advancing and receding movement. The combined movements imparted to bar G by cams H and I bring it up nearly to or in contact with tubes $d$ at the instant they pass down through the web. During these operations the lifters E remain at rest, each projecting up for about a third of its length between the blades of the lateral displacer D. This displacer now moves laterally a distance equal to the space between two adjacent blades—that is, each blade is moved to the position occupied before by that blade next to it. This movement of displacer D is effected by the cam J, Fig. 3, which acts on a roller on lever J', connected by a rod J² with a lever J³, fixed on a rock-shaft J⁴. On the other extremity of this shaft is mounted (see Fig. 4) an eccentric J⁵, to which is secured a chain or cord $e$, which passes over a guide-sheave $f$, and is attached at its other end to an arm K. The cam J acts, through the mechanical elements described, to move shaft C endwise, and the extent of this movement is equal to the amount of end-play left at the bearings $c\ c'$, Fig. 4. The shaft C is retracted or moved in the opposite direction by a spring $C^×$. As the lifters E and displacer D are both mounted on this same shaft C, both will move together and partake of this movement of the shaft endwise across the loom, and the relative positions of these parts D and E will not be changed. The connection of the lifters E with the shaft C is through the medium of arms $E^×$ on said shaft, a bar $E^2$, mounted in said arms, and the angular arms $E^3$, connecting the lifter-bar E' with said bar $E^2$. This construction is seen in Figs. 3 and 4.

Each blade of the displacer carries with it a strand of the wool to form a tuft. Fig. 14 shows the movement begun, and it is easy to conceive that in order to throw up the free end of the strand of wool around the two warp-threads $o$ and 1 it will now only be necessary to push upward the lifter E, which up to this time has remained at rest, as in Fig. 13. The bar G, which has occupied the position seen in Fig. 13, rises above the reed A, being actuated by the cams H and I, (see Fig. 15,) and it rests for the time in this position. The reed A now advances up as nearly as possible to the blades of the displacer D, and this serves to wedge apart a little the groups of warp-threads, or to more definitely divide the groups by reason of the double thickness of the reed-dents between each group of seven threads. This doubling of the thickness of the dents serves to distance the threads of the warps and allow room for the tufts. These dents of double thickness are designated by the letter $b'$ in Figs. 6 and 15. The lifters E now rise, being favored by this separation of the threads of the warp into distinct groups with open spaces between them. The lifter-bar E' is actuated by the combination of two cams L and M, Fig. 3. The cam L acts on a roller on lever L', which is connected by a rod L² to the lower arm of the lever L³, movable on shaft N. This lever L³ is coupled at its upper end by a link or rod $g$ to a bar $g^×$, that slides in a guide $h$, and rods $f'$ couple this bar $g^×$ to the lifter-bar. This mechanism imparts to the lifter-bar E' a horizontal reciprocating movement forward and back, governed by the form of cam L. On the other hand, the cam M actuates a lever M', connected by a rod M² with an arm M³, fixed on the rock-shaft N. Two other arms M⁴ on the shaft N are coupled by rods $l$ to the bar E'. This last-described mechanism imparts to the bar E' a vertical movement governed by the form of cam M. These two cams L and M are set and shaped in such a manner that the lifters E, thus raised or projected up into the web, as before stated, push or carry up with them the wool strands to form the tufts. Then they are drawn down and back again by springs which oppose the actuating-cams. These springs will be of the usual kind, and are seen in Fig. 3. After the retraction of the lifters each tuft will be found in the position seen in Fig. 16. The batten then draws back and the heddles $a\ a'\ a^2$ set the warp as follows: Warp-thread 2 raised, two warp-threads 3 raised, warp-thread $o$ lowered, warp-thread 1 lowered, two warp-threads 4 lowered, the shed being open and web-thread $1^×$ shot, and before the reed A is brought up, the bar G, which has been standing as seen in Fig. 15, is again brought down to the position it is represented as occupying in Fig. 13, and slides over the surface of the warp until it comes to press against the row of tufts just placed, thus aligning and evening them. This is the more necessary, as they may be misplaced by the lifters E and are apt to be out of line. This operation performed, the evener-bar again returns to the position seen in Figs. 3 and 15. The reed A, actuated by its cams mounted on the central shaft P, advances and beats up the shot and the row of tufts, while the row or range of wool strands are being cut off a little way below the tubes $d$. This cutting off of the strands may be effected by known means. That I employ by preference comprises a fixed blade and a rolling disk actuated by cams mounted on the central shaft P. The blade and disk are brought together, the disk rolling along over the strands and pressing thereon with sufficient force to cause the blade to sever them. The disk is actuated by a rack and pinion. The disk rolls along a grooved way or track over the sides or faces of the strands, (indicated by $n$ in Fig. 17,) cutting off the strands at the proper height to form the pile required. This done, the strand-carrier and disk separate, the disk returning to its point of departure by the groove parallel to the range of tubes, which groove forms its track and guide in its advancing movement.

A device for cutting off the tuft strands, similar to that just described, is illustrated in the patent of Smith and Skinner, before mentioned. The bar $F^2$ of the spool $F^3$ is freed by the severing of the wool strands, and it is now raised by the arms F, which attach it again to the endless chain $F'$. This chain is then moved by its sprocket-wheel far enough to present the next spool, with its appurtenances, to the arms F. The weft-threads $2^\times$ and $3^\times$ are now shot and beaten up by reed A like the thread $1^\times$, the cams operating the heddles in the proper manner to produce the sheds in the manner desired. After the passage of the last weft-thread the operations described will be repeated to form the next succeeding range or row of tufts. As the lever $J'$ is directly in front of the lever $B'$, as the latter is viewed in Fig. 3, only the upper end of the lever $J'$ is represented. However, it will be constructed in all respects like the lever $B'$.

I have represented the cam J, lever $J'$, rod $J^2$, and arm or lever $J^3$ in broken lines in Fig. 3, as they are supposed to stand in front of the plane of the drawings.

Having thus described my invention, I claim—

1. The combination, with the shedding mechanism, of the reed which separates the warp-threads into groups, the lateral displacers which displace the tuft strands laterally, mechanism, substantially as described, whereby said displacers are actuated, the lifters which lift the strands, mechanism, substantially as described, whereby said lifters are actuated, the strand-carriers, and the mechanism for actuating the same, all arranged to operate substantially as set forth.

2. The combination, with the shedding mechanism, of the reed A, having elbow-like bends in its dents, all turned in one direction for shifting the warp, substantially as set forth.

3. The combination, with the shedding mechanism, the reed A, having bends in its dents, as described, the strand carriers and lifters, and the operative mechanism of said carriers and lifters, of the lateral displacer D, consisting of a bar with blades, as described, and mechanism for operating said displacer, substantially as described.

4. The combination of the evener-bar G, adapted to play over the web and against the range of tufts, whereby the same are aligned, and mechanism, substantially as described, for operating said bar.

In witness whereof I have hereunto signed my name in the presence of two subscribing witnesses.

ANDRÉ CHARLES HENRY SALLANDROUZE.

Witnesses:
  ROBT. M. HOOPER,
  ARMENGARD, Jeune.